(12) United States Patent
Kim et al.

(10) Patent No.: US 8,026,008 B2
(45) Date of Patent: Sep. 27, 2011

(54) LITHIUM SECONDARY BATTERY WITH IMPROVED CELL CHARACTERISTICS

(75) Inventors: Soojin Kim, Daejeon (KR); Hong-Kyu Park, Daejeon (KR); Sung kyun Chang, Daejeon (KR); Jeong-Ju Cho, Daejeon (KR); Hochun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/723,119

(22) Filed: Mar. 12, 2010

(65) Prior Publication Data

US 2010/0297510 A1 Nov. 25, 2010

Related U.S. Application Data

(63) Continuation of application No. PCT/KR2009/006850, filed on Nov. 20, 2009.

(30) Foreign Application Priority Data

Nov. 20, 2008 (KR) ........................ 10-2008-0115442
Nov. 20, 2008 (KR) ........................ 10-2008-0115443
Jun. 17, 2009 (KR) ........................ 10-2009-0054103

(51) Int. Cl.
*H01M 4/48* (2010.01)

(52) U.S. Cl. ...................................... 429/338; 429/231.1
(58) Field of Classification Search .................. 429/224, 429/231.1, 223, 338
See application file for complete search history.

(56) References Cited

U.S. PATENT DOCUMENTS

| 2005/0106470 A1 * | 5/2005 | Yoon et al. ..................... 429/324 |
| 2005/0271943 A1 * | 12/2005 | Park et al. ................... 429/231.1 |
| 2006/0204845 A1 * | 9/2006 | Chang et al. ..................... 429/209 |

FOREIGN PATENT DOCUMENTS

WO WO 2009078668 A2 * 6/2009

\* cited by examiner

*Primary Examiner* — Gregg Cantelmo
(74) *Attorney, Agent, or Firm* — Birch, Stewart, Kolasch & Birch, LLP

(57) ABSTRACT

Disclosed herein is a lithium secondary cell including 20 to 100 wt. % of lithium transition metal oxide represented by a formula of $Li_{1+z}Ni_bMn_cMe_{1-(b+c)}O_2$, relative to a total amount of a cathode active material, as well as an electrolyte consisting of a lithium salt and a non-aqueous solvent, wherein a first additive to form a protective film (that is, a solid electrolyte interface film: SEI film) over a surface of an anode active material and a second additive to form another SEI film over the surface of the anode active material while inactivating impurities contained in the cathode active material are included in the electrolyte.

15 Claims, No Drawings

LITHIUM SECONDARY BATTERY WITH IMPROVED CELL CHARACTERISTICS

FIELD OF THE INVENTION

The present invention relates to lithium secondary cells with enhanced cell characteristics and, more particularly, to a lithium secondary cell that includes 20 to 100 wt. % of lithium transition metal oxide represented by a specific chemical formula, relative to a total amount of cathode active material, and an electrolyte consisting of a lithium salt and a non-aqueous solvent, wherein a first additive to form a protective film over a surface of an anode active material and a second additive to form another protective film over the surface of the anode active material while inactivating impurities contained in the cathode active material are included in the electrolyte.

BACKGROUND OF THE INVENTION

With technological advancement and demand for mobile instruments, demand for secondary cells as an energy source is rapidly increasing. Among such secondary cells, a lithium secondary cell having high energy density and working potential, a long life cycle, and reduced self-discharge is widely used in the related art.

For a lithium secondary cell, lithium ions move from lithium metal oxide used as a cathode to graphite used as an anode at an initial charge stage, in turn, being interposed between interlayers of the graphite anode. In this regard, lithium is highly active and an electrolyte reacts with a lithium salt on a surface of the graphite anode having lithium interposed between the interlayers thereof, so as to generate a particular compound such as $Li_2CO_3$, $Li_2O$, $LiOH$, etc. This compound forms, in general, a passivation layer on the surface of the graphite anode and such a passivation layer is referred to as a solid electrolyte interface "SEI" layer.

The formed SEI layer serves as an ion tunnel to selectively pass lithium ions therethrough which, in turn, prevents side reaction of the lithium ions with the graphite anode or other materials. A charge quantity consumed for forming the SEI layer is substantially an irreversible charge capacity which is not reversibly used for a discharge process. Therefore, the electrolyte is not further decomposed and an amount of lithium ions in the electrolyte is reversibly retained, thereby attaining stable charge-discharge performance (J. Powder Sources (1994) 51:79-104). As a result, when the SEI layer is formed, the amount of lithium ions may be reversibly retained and a lithium cell may have enhanced lifespan properties.

The SEI layer described above is relatively rigid under general conditions for maintaining stability of an electrolyte, that is, at a temperature of −20 to 60° C. and a voltage of not more than 4V, thus sufficiently preventing side reaction between an anode and the electrolyte. However, if a cell is stored in a full-charge state at a high temperature (for example, when the cell is left at 90° C. for 4 hours after completely charging the same at 4.2V), a significant problem such as slow deterioration in durability of SEI film is entailed.

More particularly, when a lithium cell is stored in a full-charge state, an SEI film gradually collapses over time and exposes an anode of the cell, and a surface of the exposed anode reacts with an electrolyte to occur a side reaction and generate gases such as CO, $CO_2$, $CH_4$, $C_3H_6$, etc., thus causing increase in internal pressure of the cell.

The SEI layer shows varied characteristics depending on types of a solvent contained in the electrolyte and/or chemical properties of additives and such characteristics are known as a major parameter that influences transfer of ions and charge, in turn, varying cell performance (see Shoichiro Mori, "Chemical properties of various organic electrolytes for lithium rechargeable batteries," J. Power Source (1997) Vol. 68).

Accordingly, there is a requirement for development of novel techniques to prevent variation in cell performance by adding a desired amount of additive to a cell in order to inhibit adverse effects on transfer of ions and charge while embodying inherent efficiency of the additive.

A major cathode active material for the lithium secondary cell comprises lithium-containing cobalt oxide ($LiCoO_2$). Other substances including, for example, lithium-containing manganese oxide such as $LiMnO_2$ with a layered crystalline structure or $LiMn_2O_4$ with a spinel crystalline structure, lithium-containing nickel oxide $LiNiO_2$, and the like may also be considered.

Especially, although $LiCoO_2$ with favorable features such as excellent cycle characteristics is widely used, the above material has some disadvantages such as high price due to inclusion of cobalt as a limited mineral resource and, in turn, restriction in mass application as a power source for electric vehicles, and so forth.

Lithium manganese oxides such as $LiMnO_2$, $LiMn_2O_4$, etc. have economic merits of using manganese as a raw material, which is an eco-friendly and abundant natural resource, thus drawing considerable attention as a new cathode active material for replacement of $LiCoO_2$. However, they have some drawbacks such as low capacity, poor cycle characteristics, and the like.

In addition, lithium nickel based oxide such as $LiNiO_2$ is relatively cheap and shows high discharge capacity when being charged to 4.3V and, in particular, a reversible capacity of doped $LiNiO_2$ is near 200 mAh/g exceeding a capacity of $LiCoO_2$ (about 165 mAh/g). Therefore, in spite of its low average discharge voltage and volumetric density, a commercially available battery utilizing an $LiNiO_2$ cathode active material exhibits enhanced energy density. Studies into such nickel based cathode active materials are recently increasing number in order to develop improved high capacity cells.

However, the foregoing $LiNiO_2$ based cathode active material encounters some problems including, for example, a rapid phase transformation in crystalline structure caused by variation in volume during a charge-discharge cycle, drastically reduced chemical resistance when exposed to air and moisture, generation of a large quantity of gas during storage or charge-discharge cycle, etc., thus restricting practical utilization thereof.

In order to solve such problems, a lithium transition oxide wherein nickel in the oxide was partially substituted with any other transition metal such as manganese, cobalt, and the like has been proposed. Such metal substituted nickel-lithium transition oxide has excellent cycle characteristics and capacity properties, however, if a cell is used for a long time, the cycle characteristics are drastically deteriorated and some problems of the cell such as cell swelling due to gas generation, impurities generated due to reduced chemical stability, etc. are not sufficiently overcome. Especially, a lithium nickel transition metal oxide with high Ni content entails problems such as significant cell swelling and poor stability at a high temperature.

Accordingly, there is still a strong requirement for development of improved techniques to solve high temperature stability problems caused by impurities while utilizing a lithium nickel based cathode active material suitable for high capacity cells.

In this regard, as electrolyte additives useful for enhancing cycle characteristics and high temperature stability of a cell, vinylene carbonate, vinylethylene carbonate, and the like have been disclosed. These materials are known to react with an electrolyte to form an SEI film over a surface of an anode.

However, such formed SEI film has relatively low thermal stability and, when being used at room temperature or more for a long period of time or being stored at a high temperature, is decomposed to expose a surface of the anode, in turn deteriorating performance of the cell. Further, if the foregoing material is used in a cell containing nickel-lithium transition metal oxide as a cathode active material, cell swelling and high temperature stability are more seriously deteriorated. Therefore, it is substantially impossible to apply the foregoing additive to the cell.

In this regard, Korean Laid-Open Patent Application No. 2004-0065152 describes a cell having $LiCoO_2$ as a cathode active material, wherein a non-aqueous electrolyte of the cell includes a polyether modified silicon oil with a structure having a polyether chain bonded to a terminal of a linear polysiloxane chain, and ethylene carbonate (EC) mixed with the silicon oil.

Japanese Laid-Open Patent Application No. 2006-086101 describes a cell having $LiCoO_2$ as a cathode active material wherein a polymer electrolyte contained in the cell comprises: (1) a polymer having a main chain consisting of polyolefin, polysiloxane or polyphosphazene and a branched chain with an oxide structure; (2) an additive based on a low molecular weight compound with a molecular weight of 103 to 108; (3) a lithium salt compound; and (4) a cyclic carbonate having an un-saturated group.

According to disclosures by the present inventors, however, even when the foregoing technologies are applied, a cell containing nickel-lithium transition metal oxide as a cathode active material does not have enhanced cycle characteristics and, in addition, high temperature stability and/or cell swelling is substantially not improved.

Accordingly, for application of lithium transition metal oxide with high Ni content as a cathode active material, a novel technique to prevent deterioration of cycle characteristics, capacity properties and/or high temperature stability caused by impurities is required.

SUMMARY OF THE INVENTION

Therefore, the present invention is directed to solving conventional problems described above and to overcoming technical restrictions in related arts.

As a result of extensive studies and a number of experiments executed by the present inventors, it was found that a lithium secondary cell comprising a nickel based cathode active material and an electrolyte, which is fabricated by simultaneously adding both a first additive to form a protective film over a surface of an anode active material and a second additive to form another protective film over the surface of the anode active material while inactivating impurities contained in the cathode active material may enable inactivation of impurities contained in the cathode active material, in turn inhibiting cell swelling and improving stability of the cell. Therefore, a high capacity lithium secondary cell may be fabricated. As a result, the present invention was successfully completed.

Accordingly, the present invention provides a lithium secondary cell, comprising: 20 to 100 wt. % of lithium transition metal oxide represented by the following chemical formula 1, relative to a total amount of a cathode active material,

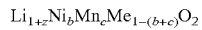     (1)

wherein $-0.5 \leq z \leq 0.5$, $0.3 \leq b \leq 0.9$, $0.1 \leq c \leq 0.8$, $b+c<1$, Me is at least one element selected from a group consisting of Co, Al, Mg, Ti, Sr, Zn, B, Ca, Si, Ga, Sn, P, V, Sb, Nb, Ta, Mo, W, Zr, Y and Fe; and an electrolyte consisting of a lithium salt and a non-aqueous solvent, wherein a first additive to form a protective film over a surface of an anode active material and a second additive to form another protective film over the surface of the anode active material while inactivating impurities contained in the cathode active material are included in the electrolyte.

More particularly, the lithium secondary cell of the present invention includes the electrolyte that contains both the first additive to form an SEI film over a surface of the anode active material and the second additive to form a protective film over the surface of the anode active material while inactivating impurities contained in the cathode active material. Therefore, the present invention may have advantages of continuously forming and/or restoring the SEI film without causing deterioration in cell performance and/or increase in irreversible capacity of the cell when the SEI film is consumed during use of the cell by, for example, storing the cell in a full charge state at a high temperature.

In addition, the present inventors found that, when the lithium transition metal oxide represented by the above formula 1 (hereinafter sometimes referred to as "metal doped nickel active material") is used as a cathode active material, simultaneously adding both the first additive and the second additive to the electrolyte may induce synergistic effects and high temperature stability of the cell may be significantly improved, compared to addition of either the first additive or the second additive alone. The reason behind such results is presumed to be that impurities contained in the metal doped nickel active material are inactivated and, at the same time, formation of a protective film over the surface of the anode active material is maximized.

Accordingly, typical problems caused by impurities of a cathode active material including, for example, reduction of cell capacity, increase in interfacial resistance due to inhibited transfer of lithium ions, gas generation by decomposition of impurities, in turn causing cell swelling, etc. may be prevented, thereby attaining excellent high temperature stability and cycle characteristics of a secondary cell.

The nickel active material used in the secondary cell of the present invention may have a discharge capacity of at least 20% higher than a cathode active material comprising lithium cobalt oxide and sufficiently exhibit high capacity properties, thereby being more efficiently applicable.

According to a preferred embodiment of the present invention, the first additive may be an additive to form a protective film over a surface of an anode active material by polymerization at an initial charge-discharge process, while the second additive may be another additive to supplement the above protective film by polymerization during further charge-discharge after the initial charge-discharge process.

Preferably, the first additive may have higher polymeric activity than that of the second additive at an initial charge-discharge potential of a secondary cell, while the second additive may have more excellent decomposition-resistant properties than that of the first additive at a charge-discharge potential other than the initial charge-discharge potential.

Since the first additive shows higher polymeric activity than the second additive at the initial charge-discharge potential, the first additive is preferentially consumed by the initial charge-discharge process.

The initial charge-discharge may depend on types of a secondary cell and be generally subjected to a formation process in manufacture of a lithium secondary cell. Such formation process is a method of activating a cell by repeating charge and discharge after assembly of the cell. During charge, lithium ions emitted from a cathode move to a carbon electrode used as an anode and are inserted therein and, at the same time, an SEI film is formed on a surface of the anode. The formation process is generally conducted by repeating charge and discharge at a certain range of constant current and constant voltage. The cell may be half-charged at 1.0 to 3.8V or fully charged at 3.8 to 4.5V. Therefore, the initial charge-discharge potential may range from 2.5 to 4.5V and, more preferably, 2.7 to 4.3V.

Examples of the first additive may include vinylene carbonate (VC), vinylene ethylene carbonate (VEC), fluoroethylene carbonate, succinic anhydride, lactide, caprolactam, ethylene sulfite, propane sulfone (PS), propene sulfone, vinyl sulfone, and derivatives and halogen substitutes thereof. Preferably, the first additive may be a cyclic carbonate compound having an unsaturated group such as VC, VEC, etc. These compounds may be used alone or in combination of two or more thereof.

As described above, for a cell having the metal doped nickel active material, VC or VEC used as an electrolyte additive may conversely accelerate decomposition of the electrolyte at a high temperature and sometimes significantly increase cell swelling, therefore, use of other additives except for VC or VEC has been considered.

However, as clearly appreciated by the following embodiments, if a second additive to form a protective film over a surface of an anode active material while inactivating impurities of a cathode active material is added to the electrolyte, it is surprisingly found that even adding VC or VEC compatible with the second additive may considerably reduce decomposition of an electrolyte and cell swelling, so as to greatly enhance stability of the cell and sufficiently exhibit beneficial effects such as improved cycle characteristics thanks to formation of a rigid SEI film.

Although the reason behind such facts is not clearly demonstrated, it is considered that decomposition of an electrolyte is accelerated by reacting conventional VC or VEC with impurities contained in a metal doped nickel active material. On the contrary, concurrent addition of a second additive as well as VC or VEC according to the present invention enables inactivation of impurities, thus expecting inhibition of the foregoing phenomenon (such as decomposition of electrolyte).

Preferred examples of the second additive include a material having at least one Si—O—Si bond or carbon-carbon double bond, a material having both at least one Si—O—Si bond and at least one carbon-carbon double bond by reaction of impurities with water, and so forth. Such material may have at least two carbon-carbon double bonds, more preferably, 2 or 3 carbon-carbon double bonds.

The above material includes a functional group having a carbon-carbon double bond as well as siloxane capable of transferring lithium ions, so as to form an SEI film through cross-linking and exhibit excellent lithium ion mobility. Since the functional group having a carbon-carbon double bond and the siloxane represent δ−polarization and δ+polarization, respectively, these materials are combined with impurities having opposite polarization so as to inactivate the impurities. Here, a specific polarization (δ+ or δ−) site alone may be oriented in a direction of the second additive or, otherwise, both the δ+ and the δ−sites may be concurrently oriented in the direction of the second additive.

According to a preferred embodiment of the present invention, the second additive may be a compound represented by the following formula 2:

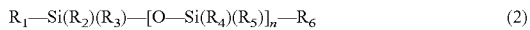

$$R_1—Si(R_2)(R_3)—[O—Si(R_4)(R_5)]_n—R_6 \quad (2)$$

wherein n ranges from 0 to 3, $R_1$, $R_2$, $R_3$, $R_4$, $R_5$ and $R_6$ are independently hydrogen or a $C_{1-10}$ hydrocarbon, at least one of which may have an unsaturated bond.

The $C_{1-10}$ hydrocarbon includes all "alkyl", "alkene" and "alkyne," and these may have branched, straight or cyclic structures.

Alkyl may include, for example, methyl, ethyl, propyl, isopropyl, butyl, isobutyl, t-butyl, pentyl, ethenyl, propenyl, butenyl, cyclopropyl, cyclobutyl, cyclopentyl, etc.

From the above formula 2, at least one of $R_1$ and $R_6$ may be alkyl having an unsaturated bond and, more preferably, at least one unsaturated bond. From the above formula 2, each of $R_2$, $R_3$, $R_4$ and $R_5$ is preferably hydrogen or alkyl and, more preferably, at least one of these groups may be methyl. In the Si—O—Si bond, alkyl bonded to Si may induce relatively small δ+polarization but protect the Si—O—Si bond by a relatively bulky structure, enabling more stable combination of alkyl with impurities under operating conditions inside a cell.

Where at least one of $R_1$ to $R_6$ has an unsaturated bond, the unsaturated bond is preferably $C_1$-$C_{10}$ lower alkene. "Alkene" used herein means a substituent group comprising at least two carbon atoms, at least one of which consists of at least one carbon-carbon double bond. Representative examples of such alkene may include ethylene (—CH=CH$_2$), propylene (—CH=CH—CH$_3$, —CH=CH—CH$_3$), butylenes (—CH=CH—C$_2$H$_5$, —CH$_2$—CH=CH—CH$_3$, —CH=CH—CH=CH$_2$), and the like.

A molecular weight (g/mol) of the second additive may range from 120 to 250. If the molecular weight is too high, a polymer is formed in the cell through cross-linking or the electrolyte becomes a gel. On the other hand, when the molecular weight is too small, the second additive is undesirable for formation of an SEI film.

If a content of the first additive or the second additive in the electrolyte is too high, an irreversible capacity of the cell is relatively increased, thus being not preferable. On the contrary, when the content is very low, it is difficult to sufficiently embody impurity inactivation effects. In consideration of the above facts, each of the first additive and the second additive is preferably included in an amount of 0.01 to 10 wt. % and, more preferably, 0.01 to 5 wt. % relative to a total weight of the electrolyte.

However, the first additive such as VC or VEC is unstable under decomposition conditions and, if added in excess quantities, may be decomposed, thereby inducing cell swelling or accelerating decomposition of the electrolyte. That is, excess of the first additive with high activity may induce a variety of side reactions or increase a thickness of the SEI film, in turn causing increase in internal resistance of the cell.

Therefore, the first additive is preferably added in an amount completely consumed during initial charge-discharge and the amount completely consumed during initial charge-discharge may be varied depending on cell capacity or types of the cell and, preferably, may range from 0.01 to 0.5 wt. % relative to a total weight of the electrolyte.

The impurities contained in the cathode active material may include, for example, impurities formed by reaction of lithium ions with moisture or $CO_2$, impurities such as $Li_2CO_3$, LiOH, $Li_2O$, and the like induced from a lithium source left behind during manufacture of the cathode active material and, in particular, NiO formed on a surface of a nickel based transition metal oxide when an excessive amount of nickel is contained, etc. Such impurities are mostly located on the surface of the cathode active material and may comprise a material exhibiting δ−/δ+polarization by interfacial reaction between the impurities and an electrolyte or additive during operation of the cell.

The metal doped nickel cathode active material of the present invention is represented by a formula, $Li_{1+z}Ni_b Mn_cMe_{1-(b+c)}O_2$ wherein a molar fraction of nickel is not less than 30% and the active material contains Mn and other desired metal elements (Me). The above cathode active material has relatively higher capacity than lithium cobalt oxide and superior structural stability over lithium nickel oxide ($LiNiO_2$).

According to a preferred embodiment, the metal doped nickel based cathode active material may be a so-called ternary system substance containing Co as the Me. Here, the Ni content ranges from 0.3 to 0.9 and, preferably, 0.33 to 0.8, as defined above. If the Ni content among transition metals is too low, it is difficult to attain high capacity. On the contrary, if the Ni content is too high, a crystalline structure may be distorted or collapsed. In consideration of such facts, the metal doped nickel active material may have relatively excess Ni content, compared to Mn and Co. Preferably, a molar fraction of Ni ranges from 40 to 70%, that is, b in formula 1 may range from 0.4 to 0.7. Although the lithium transition metal oxide with excess Ni content has merits of high capacity and working potential, however, problems of poor high temperature characteristics due to impurities may be encountered. The secondary cell of the present invention includes an additive combined with impurities in the electrolyte to inactivate the impurities, thus effectively reducing the foregoing problems.

The cathode active material may comprise lithium transition metal oxides represented by the formula 1 alone or, occasionally, combinations of such oxides with other cathode active materials, enabling sorption and discharge of lithium ions.

Examples of such cathode active material may include: layered compounds such as lithium cobalt oxides ($LiCoO_2$), lithium nickel oxides ($LiNiO_2$), etc. or compounds substituted by at least one transition metal; lithium manganese compounds such as oxides represented by $Li_{1+z}Mn_{2-y}O_4$ (wherein y ranges from 0 to 0.33), $LiMnO_3$, $LiMn_2O_3$, $LiMnO_2$, etc.; lithium copper oxides ($Li_2CuO_2$); vanadium oxides such as $LiV_3O_8$, $LiFe_3O_4$, $V_2O_5$, $Cu_2V_2O_7$, etc.; Ni site type lithium nickel oxides represented by a formula of $LiNi_{1-y}M_yO_2$ (wherein M=Co, Mn, Al, Cu, Fe, Mg, B or Ga, and y=0.01 to 0.3); lithium manganese composite oxides represented by either formula of $LiMn_{2-y}M_yO_2$ (wherein M=Co, Ni, Fe, Cr, Zn or Ta, and y=0.01 to 0.1) or $Li_2Mn_3MO_8$ (wherein M=Fe, Co, Ni, Cu or Zn); $LiMn_2O_4$ wherein Li is partially substituted by alkaline earth metal ions; disulfide compounds; $Fe_2(MoO_4)_3$, and the like, without particular limitation thereto.

According to a preferred embodiment of the present invention, the foregoing cathode active material may further include $LiCoO_2$ other than the lithium transition metal oxide represented by the formula 1 and, in this case, an amount of $LiCoO_2$ may range from 30 to 80 wt. % relative to a total weight of the cathode active material.

However, the lithium transition metal oxide represented by Formula 1 has high discharge capacity, therefore, may be added in an amount of not less than 20 wt. % and, more preferably, 20 to 80 wt. %, relative to a total weight of the cathode active material.

For the lithium secondary cell of the present invention, the electrolyte may comprise a liquid electrolyte consisting of a non-aqueous solvent and a lithium salt.

Such non-aqueous solvent may be an aprotic organic solvent including, for example, N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxyfuran, 2-methyl tetrahydrofuran, dimethylsulfoxide, 1,3-dioxolane, formamide, dimethyl formamide, dioxolane, acetonitrile, nitromethane, methyl formate, phosphoric acid triester, trimethoxymethane, dioxolane derivative, sulfolane, methylsulfolane, 1,3-dimethyl-2-imidazolidinone, propylene carbonate derivatives, tetrahydrofuran derivatives, ether, methyl propionate, ethyl propionate, and the like. Such solvent may be used alone or in combination of two or more thereof. Preferably, a composite of a linear carbonate and a cyclic carbonate is used.

The lithium salt used for the electrolyte may be a substance suitably dissolved in the non-aqueous solvent, in turn, being dissociated. Examples of such lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate, imide, etc.

For improvement of charge-discharge features and/or flame retardancy, the electrolyte may further include, for example, pyridine, triethyl phosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, aluminum trichloride, etc. Optionally, the electrolyte may include a halogen solvent such as carbon tetrachloride, ethylene trifluoride, etc. to provide non-flammability and/or carbon dioxide gas to improve high temperature preservation of the electrolyte.

The lithium secondary cell of the present invention may comprise, for example, a cathode, an anode, a separator and a non-aqueous electrolyte containing lithium salt.

The cathode is fabricated by, for example, applying a mixture of the cathode active material, a conductive material and a binder to a cathode collector and drying the coated collector. Optionally, a filler may be added to the mixture. The anode is fabricated by applying the anode active material to an anode collector and drying the coated collector and, if necessary, may further contain the foregoing ingredients.

The separator is interposed between the cathode and the anode and is composed of a thin insulation film having a high ion permeability and excellent mechanical strength.

The collector, active materials, conductive materials, binder, filler, separator, electrolyte and lithium salt described above are known in related arts and a detailed description thereof will be omitted for brevity.

The lithium secondary cell of the present invention may be fabricated according to any conventional method known in related arts. In the lithium secondary cell of the present invention, configurations of the cathode, anode and separator are not particularly restricted and, for example, each sheet may be placed in a circular, angular or pouch type case in a winding or stacking form.

DETAILED DESCRIPTION OF PREFERRED EMBODIMENTS

Hereinafter, exemplary embodiments of the present invention will be described in greater detail with reference to the following examples. However, those skilled in the art will appreciate that these embodiments are proposed for illustrative purpose only and do not restrict the scope of the present invention.

EXAMPLE 1

1-1. Preparation of Electrolyte 0.5 wt. % of siloxane derivative represented by Formula 2 (n=1), which includes 1.5 wt. % VC as an electrolyte additive, methyl substituents ($R_2$, $R_3$, $R_4$, $R_5$) and two ethylene groups ($R_1$, $R_6$), was added to 1.0M electrolyte comprising $LiPF_6$ in EC:EMC (1:2 ratio by volume), thereby preparing an electrolyte for a lithium secondary cell.

1-2. Preparation of Anode

After mixing synthetic graphite, an SBR based binder, and a thickener in a ratio of 98:1:1 to prepare an aqueous slurry, the slurry was applied over a copper foil collector to form an anode.

1-3. Preparation of Cathode 33 wt. % of $LiNi_{0.53}Co_{0.2}Mn_{0.27}O_2$ and 77 wt. % of $LiCoO_2$ relative to a total weight of a cathode active material were mixed together to prepare the cathode active material. The active material, a conductive material and a binder were admixed in a ratio of 96:2:2 to prepare a slurry. Then, the slurry was applied over an aluminum foil collector, followed by drying the same according to any conventional method, thus forming a cathode.

1-4. Fabrication of Cell

The formed anode and cathode were made into an angular body '523443' with a desired size and the above electrolyte prepared in Step 1-1 was poured into the angular body to fabricate a lithium secondary cell. The fabricated cell was charged to 4.2V at 850 mA and again fully charged from 4.2V to a constant voltage until the current reached a termination current of 50 mA. Afterwards, the cell was discharged to a termination voltage of 3V at 930 mA. After this initial charge-discharge, a charge-discharge cycle to charge the cell to an upper limit voltage of 4.2V at 850 mA and to discharge the same to the termination voltage of 3V was repeated five (5) times. After the fifth charge cycle, the cell was preserved at 90° C. for 4 hours, then, discharged under the same conditions. A capacity of the cell was measured.

EXAMPLE 2

A lithium secondary cell was fabricated according to the same procedure as described in Example 1, except that 0.5 wt. % of siloxane derivative represented by Formula 2 which has multiple methyl substituents and one ethylene group was added as an electrolyte additive so as to prepare an electrolyte, instead of a siloxane derivative represented by Formula 2 which has multiple methyl substituents and two ethylene groups.

EXAMPLE 3

A lithium secondary cell was fabricated according to the same procedure as described in Example 1, except that 0.5 wt. % of siloxane derivative represented by Formula 2, which has multiple methyl substituents and two ethylene groups and in which at least one of the methyl substituents is substituted by hydrogen, was added as an electrolyte additive so as to prepare an electrolyte, instead of a siloxane derivative represented by Formula 2 which has multiple methyl substituents and two ethylene groups.

EXAMPLE 4

A lithium secondary cell was fabricated according to the same procedure as described in Example 1, except that VC as an electrolyte additive was added in an amount of not 1.5 wt. % but 0.5 wt. %, so as to prepare an electrolyte.

EXAMPLE 5

A lithium secondary cell was fabricated according to the same procedure as described in Example 1, except that $LiNi_{0.8}Co_{0.1}Mn_{0.1}O_2$ was used as a cathode active material, so as to prepare a cathode.

EXAMPLE 6

A lithium secondary cell was fabricated according to the same procedure as described in Example 1, except that $LiNi_{1/3}Co_{1/3}Mn_{1/3}O_2$ was used as a cathode active material, so as to prepare a cathode.

COMPARATIVE EXAMPLE 1

A lithium secondary cell was fabricated according to the same procedure as described in Example 1, except that an electrolyte additive was not added.

COMPARATIVE EXAMPLE 2

A lithium secondary cell was fabricated according to the same procedure as described in Example 1, except that 1.5 wt. % VC alone was added as an electrolyte additive so as to prepare an electrolyte.

COMPARATIVE EXAMPLE 3

A lithium secondary cell was fabricated according to the same procedure as described in Example 1, except that 0.5 wt. % of siloxane derivative represented by Formula 2, which has multiple methyl substituents and two ethylene groups, was added alone as an electrolyte additive so as to prepare an electrolyte.

COMPARATIVE EXAMPLE 4

A lithium secondary cell was fabricated according to the same procedure as described in Example 1, except that $LiCoO_2$ was used as a cathode active material, so as to prepare a cathode.

COMPARATIVE EXAMPLE 5

A lithium secondary cell was fabricated according to the same procedure as described in Example 1, except that $LiNiO_2$ was used as a cathode active material, so as to prepare a cathode.

COMPARATIVE EXAMPLE 6

A lithium secondary cell was fabricated according to the same procedure as described in Example 1, except that 1.5 wt. % VEC was added alone as an electrolyte additive so as to prepare an electrolyte.

EXPERIMENTAL EXAMPLE 1

Assay of Lifespan Characteristics

For battery cells fabricated in the foregoing examples and comparative examples, a variation in thickness during 400 charge-discharge cycles and a capacity of each cell in charged state were measured and the measured results are shown in TABLE 1 below.

EXPERIMENTAL EXAMPLE 2

Assay of High Temperature Preservation Characteristics

After storing each of the cells fabricated in the foregoing examples and comparative examples at 60° C. for four (4) weeks, a cell capacity was measured and a ratio of the measured capacity to initial capacity is shown in TABLE 1 below.

TABLE 1

| | Cathode active material | Additive (content) | Discharge capacity holding rate at 400 cycles (%) | Variation of thickness (m/m) | Ratio of capacity after storage at high temperature (%) |
|---|---|---|---|---|---|
| Example 1 | $LiNi_{0.53}Co_{0.2}Mn_{0.27}O_2$ + $LiCoO_2$ | Two C = C (0.5) + VC (1.5) | 84 | 0.62 | 92.4 |
| Example 2 | $LiNi_{0.53}Co_{0.2}Mn_{0.27}O_2$ + $LiCoO_2$ | One C = C (0.5) + VC (1.5) | 81 | 0.74 | 91.6 |
| Example 3 | $LiNi_{0.53}Co_{0.2}Mn_{0.27}O_2$ + $LiCoO_2$ | Three CH (0.5) + VC (1.5) | 81 | 0.73 | 91.7 |
| Example 4 | $LiNi_{0.53}Co_{0.2}Mn_{0.27}O_2$ + $LiCoO_2$ | Two C = C (0.5) + VC (0.5) | 76 | 0.48 | 93.7 |
| Example 5 | $LiNi_{0.8}Co_{0.1}Mn_{0.1}O_2$ + $LiCoO_2$ | Two C = C (0.5) + VC (1.5) | 79 | 1.92 | 79.4 |
| Example 6 | $LiNi_{1/3}Co_{1/3}Mn_{1/3}O_2$ + $LiCoO_2$ | Two C = C (0.5) + VC (1.5) | 79 | 0.67 | 93.2 |
| Comparative example 1 | $LiNi_{0.53}Co_{0.2}Mn_{0.27}O_2$ + $LiCoO_2$ | — | 68 | 1.79 | 82.4 |
| Comparative example 2 | $LiNi_{0.53}Co_{0.2}Mn_{0.27}O_2$ + $LiCoO_2$ | VC (1.5) | 82 | 2.43 | 79.2 |
| Comparative example 3 | $LiNi_{0.53}Co_{0.2}Mn_{0.27}O_2$ + $LiCoO_2$ | Two C = C (0.5) | 77 | 0.24 | 93.7 |
| Comparative example 4 | $LiCoO_2$ | Two C = C (0.5) + VC (1.5) | 83 | 0.72 | 94.7 |
| Comparative example 5 | $LiNiO_2$ | Two C = C (0.5) + VC (1.5) | 70 | 3.09 | 68.2 |
| Comparative example 6 | $LiNi_{0.53}Co_{0.2}Mn_{0.27}O_2$ + $LiCoO_2$ | VEC (1.5) | 82 | 1.68 | 78.8 |

As shown in TABLE 1, it was found that each of the lithium secondary cells fabricated in Examples of the present invention, which includes a ternary system compound consisting of lithium nickel-cobalt-manganese oxide as a cathode active material and an electrolyte additive comprising a specific siloxane derivative and VC, exhibits remarkably improved cycle characteristics and high temperature stability, compared to a secondary cell fabricated without an additive (Comparative Example 1) or another secondary cell having lithium nickel oxide alone as a cathode active material (Comparative Example 5). It was also found that the inventive secondary cell shows cell characteristics substantially identical to those of a cell fabricated using lithium cobalt oxide as a cathode active material (Comparative Example 4).

A cell having VC alone as an electrolyte additive (Comparative Example 2) and another cell having VEC alone as the electrolyte additive (Comparative Example 6) have problems of poor high temperature preservation and reduced rate of thickness increase, while a cell having a siloxane derivative alone (Comparative Example 3) entails relatively low cycle characteristics. Consequently, it can be seen that the present invention using a combination of the foregoing additives attains considerable synergistic effects.

Meanwhile, if a molar ratio of nickel to lithium nickel-cobalt-manganese oxide is 0.8 (Example 5), a rate of thickness increase is relatively high. On the other hand, when the same molar ratio is near 0.3 (Example 6), an active material with high Ni content does not show excellent effects in view of capacity and entails problems such as decrease in lifespan, high rate discharge capacity and/or low temperature discharge capacity. Therefore, it was found that a desired molar ratio of nickel may range from 0.4 to 0.7.

Although the present invention has been described in detail with reference to the foregoing exemplary embodiments, these exemplary embodiments are proposed for illustrative purpose only and those skilled in the art will appreciate that various modifications and variations are possible without departing from the scope and spirit of the invention.

INDUSTRIAL APPLICABILITY

As is apparent from the above disclosure, a secondary cell of the present invention includes a first additive to form a protective film over a surface of an anode active material and a second additive to form another protective film over the surface of the anode active material. Therefore, when the inventive cell contains a metal doped nickel cathode active material, these materials may induce synergistic effects and form a rigid SEI film, thus improving cycle characteristics while effectively eliminating conventional problems such as decomposition of an electrolyte caused by impurities, cell swelling, etc. Consequently, the present invention may prevent decrease in stability of a cell at a high temperature and ultimately provide a high capacity cell.

What is claimed is:

1. A lithium secondary cell, comprising:
  20 to 100 wt. % of lithium transition metal oxide represented by the following formula 1, relative to a total amount of a cathode active material, $$Li_{1+z}Ni_bMn_cMe_{1+(b+c)}O_2 \quad (1)$$

wherein −0.5<z<0.5, 0.3<b<0.9, 0.1<c<0.8, b+c<1, Me is at least one element selected from a group consisting of Co, Al, Mg, Ti, Sr, Zn, B, Ca, Si, Ga, Sn, P, V, Sb, Nb, Ta, Mo, W, Zr, Y and Fe; and an electrolyte consisting of a lithium salt and a non-aqueous solvent, wherein a first additive to form a protective film (that is, a solid electrolyte interface film: SEI film) over a surface of an anode active material and a second additive to form another protective film over the surface of the anode active material while inactivating impurities contained in the cathode active material are included in the electrolyte, wherein the second additive is a material having both at least one Si—O—Si bond and at least two carbon-carbon double bonds by reaction of impurities with water.

2. The secondary cell according to claim 1, wherein the first additive is an additive to form a protective film over a surface of an anode active material by polymerization at an initial charge-discharge process, while the second additive is another additive to supplement the protective film of the anode active material by polymerization during further charge-discharge after the initial charge-discharge process.

3. The secondary cell according to claim 2, wherein the first additive has higher polymeric activity than that of the second additive at an initial charge-discharge potential of the secondary cell, while the second additive has more excellent decomposition-resistant properties than that of the first additive at a charge-discharge potential of the secondary cell other than the initial charge-discharge potential.

4. The secondary cell according to claim 2, wherein the charge-discharge potential of the secondary cell ranges from 2.5 to 4.5V.

5. The secondary cell according to claim 1, wherein the first additive is a cyclic carbonate compound having an unsaturated group.

6. The secondary cell according to claim 5, wherein the cyclic carbonate compound is vinylene carbonate (VC) or vinylene ethylene carbonate (VEC).

7. The secondary cell according to claim 1, wherein the second additive contains a functional group having a carbon-carbon double bond and siloxane to represent δ−polarization and δ+polarization, respectively, and these materials are combined with impurities representing opposite polarization so as to inactivate the impurities.

8. The secondary cell according to claim 1, wherein the second additive is a compound represented by the following formula 2:

$$R_1\text{—Si}(R_2)(R_3)\text{—}[O\text{—Si}(R_4)(R_5)]_n\text{—}R_6 \qquad (2)$$

wherein n ranges from 0 to 3, $R_1$, $R_2$, $R_3$, $R_4$, $R_5$ and $R_6$ are independently hydrogen or a $C_{1-10}$ hydrocarbon, at least one of which has an unsaturated bond.

9. The secondary cell according to claim 1, wherein each of the first and second additives is added in an amount of 0.01 to 10 wt. %, relative to a total weight of the electrolyte.

10. The secondary cell according to claim 9, wherein the first additive is added in a desired amount to be completely consumed during the initial charge-discharge.

11. The secondary cell according to claim 1, wherein the impurities are selected from a group consisting of NiO, $Li_2CO_3$, LiOH and $Li_2O$.

12. The secondary cell according to claim 1, wherein Me is Co and a molar fraction of Ni in the transition metal ranges from 40 to 70% in the lithium transition metal oxide represented by Formula 1.

13. The secondary cell according to claim 1, wherein the cathode active material contains the lithium transition metal oxide represented by Formula 1 in an amount of 20 to 80 wt. % relative to a total weight of the cathode active material.

14. The secondary cell according to claim 1, wherein the non-aqueous solvent is a mixture of linear carbonate and cyclic carbonate.

15. The secondary cell according to claim 1, further comprising 30 to 80 wt. of $LiCoO_2$ relative to a total weight of the cathode active material other than the lithium transition metal oxide represented by Formula 1.

* * * * *